United States Patent
Etling

(10) Patent No.: US 7,784,799 B2
(45) Date of Patent: Aug. 31, 2010

(54) APPARATUS AND METHOD FOR SEALING SURFACES

(75) Inventor: Keith A. Etling, Shiloh, IL (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 10/749,762

(22) Filed: Dec. 31, 2003

(65) Prior Publication Data
US 2005/0140098 A1    Jun. 30, 2005

(51) Int. Cl.
*F16J 15/02*    (2006.01)
*E04B 1/62*    (2006.01)
*E04F 15/14*    (2006.01)

(52) U.S. Cl. .................. 277/630; 277/637; 277/640; 277/652; 52/127.7; 52/395; 52/463; 52/741.4; 52/472; 52/718.04; 49/482.1; 49/489.1

(58) Field of Classification Search ............... 277/630, 277/637, 640, 650–652; 244/131, 132; 49/489.1, 49/483.1, 493.1, 499.1, 482.1; 52/396.05, 52/396.6, 471, 472, 127.7, 741.1, 395, 463, 52/459, 718.04, 717.03, 718.03, 717.04, 52/741.4; 403/6–9
See application file for complete search history.

(56) References Cited

U.S. PATENT DOCUMENTS

| | | | | |
|---|---|---|---|---|
| 1,576,506 A | * | 3/1926 | Davis | 49/504 |
| 1,972,545 A | * | 9/1934 | Warren | 52/717.03 |
| 2,710,113 A | * | 6/1955 | Pritchard | 220/681 |
| 3,074,520 A | * | 1/1963 | Grubelich | 403/5 |
| 3,079,653 A | * | 3/1963 | Cornell | 49/493.1 |
| 3,694,976 A | * | 10/1972 | Warshaw | 52/58 |
| 3,848,379 A | * | 11/1974 | Hazen | 52/220.5 |
| 4,533,278 A | * | 8/1985 | Corsover et al. | 404/65 |
| 4,674,252 A | * | 6/1987 | Nicholas et al. | 52/396.06 |
| 4,718,211 A | * | 1/1988 | Russell et al. | 52/409 |
| 4,773,791 A | * | 9/1988 | Hartkorn | 404/68 |

(Continued)

FOREIGN PATENT DOCUMENTS

EP    0 654 625 A    5/1995

(Continued)

OTHER PUBLICATIONS

PCT International Search Report, PCT/US2004/042946, dated Jul. 25, 2005.

*Primary Examiner*—Alison K Pickard
(74) *Attorney, Agent, or Firm*—Alston & Bird LLP

(57) ABSTRACT

The apparatus and method for sealing at least two surfaces includes a sealing member with an attachment portion fixed to one of the surfaces, and a seal portion connected to the attachment portion. The seal portion of the sealing member includes a deformable segment that may be received and retained by a receiving aperture that is defined by at least one of the surfaces. The receiving aperture may further be defined by at least one engagement member extending from at least one of the surfaces. At least one coating, such as paint, may also be located on a side of the sealing member opposite the surfaces. The seal may be engaged and disengaged without requiring reapplication of the coating. Thus, the present invention provides an effective technique for sealing parts of an object, such as sealing a door, panel, cover or the like to a surrounding structure.

16 Claims, 5 Drawing Sheets

U.S. PATENT DOCUMENTS

| | | | | |
|---|---|---|---|---|
| 4,781,489 A | * | 11/1988 | Buckenauer | 404/65 |
| 4,866,898 A | * | 9/1989 | LaRoche et al. | 52/396.01 |
| 4,977,719 A | * | 12/1990 | LaRoche et al. | 52/396.01 |
| 5,001,865 A | * | 3/1991 | Procton | 49/469 |
| 5,014,934 A | * | 5/1991 | McClaflin | 244/132 |
| 5,045,635 A | * | 9/1991 | Kaplo et al. | 174/35 GC |
| 5,126,185 A | | 6/1992 | Forrest et al. | |
| 5,156,360 A | * | 10/1992 | Shine | 244/129.1 |
| 5,197,250 A | * | 3/1993 | Kramer | 52/396.04 |
| 5,269,624 A | * | 12/1993 | Kramer | 404/64 |
| 5,357,727 A | * | 10/1994 | Duckworth et al. | 52/396.06 |
| 5,365,713 A | * | 11/1994 | Nicholas et al. | 52/573.1 |
| 5,586,772 A | * | 12/1996 | Deaver | 277/642 |
| 5,941,061 A | | 8/1999 | Sherry et al. | |
| 6,030,022 A | * | 2/2000 | Bormann et al. | 296/107.04 |
| 6,082,240 A | * | 7/2000 | Middione et al. | 89/36.08 |
| 6,105,973 A | * | 8/2000 | Butler et al. | 277/644 |
| 6,257,592 B1 | * | 7/2001 | Hashizawa et al. | 277/596 |
| 6,598,883 B1 | * | 7/2003 | Hammi et al. | 277/596 |
| 6,619,879 B1 | * | 9/2003 | Scuero | 404/74 |
| 6,655,635 B2 | * | 12/2003 | Maury et al. | 244/131 |

FOREIGN PATENT DOCUMENTS

| | | |
|---|---|---|
| EP | 0 822 357 A | 2/1998 |
| EP | 1 103 461 A | 5/2001 |

* cited by examiner

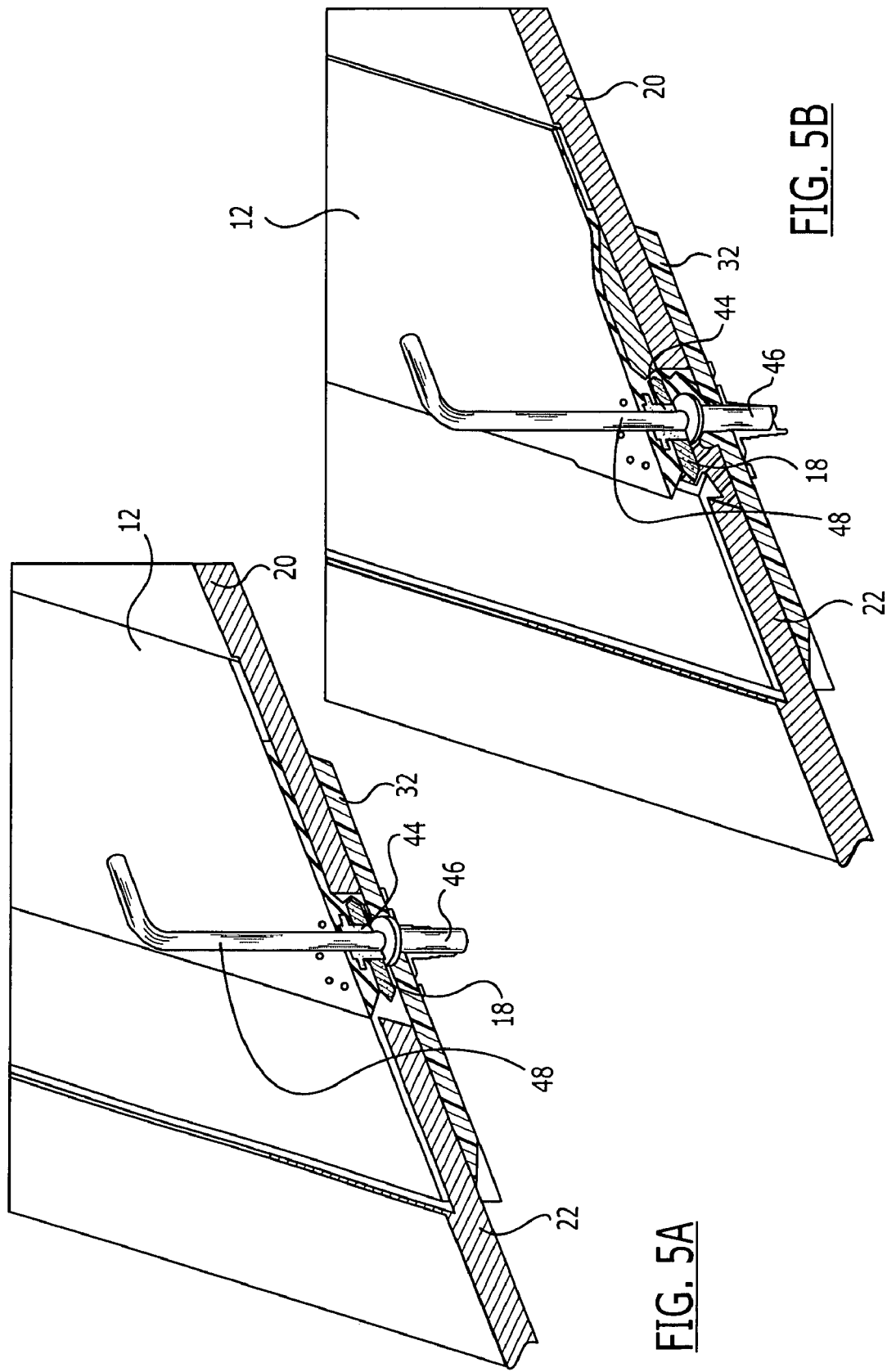

APPARATUS AND METHOD FOR SEALING SURFACES

BACKGROUND OF THE INVENTION

This invention relates to sealing surfaces and, in particular, to sealing surfaces such that the seal may be easily disengaged and engaged in order to access the surfaces and the structure below the seal as needed without damaging the seal, the surfaces or the structure.

Many applications require sealing surfaces that may have to be accessed at a later time. Such sealing is typical in applications requiring a smooth or aerodynamic shape, such as air, water and land vehicles, and other structures. In addition, the surfaces of various types of objects, such as air, water and land vehicles, and other structures may have to be coated in order to protect the objects. For instance, the objects may require protection from environmental elements.

An aircraft has service panels and doors that are typically fastened in place, with various types of fasteners, such as bolts. The entire aircraft, including the service panels and doors, is then coated with the several layers of coatings, such as with several layers of paint to provide a smooth, aerodynamic surface.

In order to preform maintenance or repairs on the aircraft, the service panels and doors must be accessed. Because the fasteners of the service panels and doors are buried under several layers of coatings, however, the service panels and doors cannot be accessed without removing the layers of coatings from at least the area surrounding the service panels and doors, including those areas in which the fasteners are installed. The coatings, and therefore the smooth aerodynamic surface, is damaged when accessing the service panels and doors. Thus, once the maintenance is completed, the damaged coatings must be replaced, such as by reapplying the layers of paint over the damaged areas. To obtain a smooth, aerodynamic surface again, however, the reapplication of the coatings is a time-consuming, labor intensive, and therefore, expensive process.

Thus, there exists a need in the industry for a technique for more easily accessing various parts of an object, such as service panels and doors, that are secured by means of fasteners and the like, and that have previously been coated, such as with one or more layers of paint.

BRIEF SUMMARY OF THE INVENTION

The apparatus and method of the present invention permit various surfaces to be sealed. For example, the apparatus and method of the present invention may provide a seal between peripheral portions of a door, panel or other covering and the surrounding structure. While the apparatus and method are useful in a wide variety of applications, the apparatus and method are particularly advantageous for vehicles, such as aircraft and the like, that will be coated, such as with paint to provide a smooth aerodynamic surface, since the seal provided by the apparatus and method of the present invention provides a smooth transition from a door, panel or the like to the surrounding structure. Additionally, the apparatus and method of the present invention provide a seal that may be easily disengaged in order to access or open the door, panel or the like, even in instances in which a coating, such as paint, has already been applied over the seal. The apparatus and method of the present invention then permit the door, panel or the like to be resealed to the surrounding structure, without having to replace the coating, which remains upon the seal even following its disengagement.

The apparatus for sealing at least two surfaces of the present invention includes a sealing member. The sealing member includes an attachment portion fixed to one of the surfaces, and a seal portion connected to the attachment portion. The seal portion of the sealing member also has a deformable segment that faces the surfaces. The seal portion may be at least partially made of a pliable material, and the attachment portion may be at least partially made of a material that is less pliable than the seal portion, such as a rigid material. As such, the seal portion may bend relative to the attachment portion. For example, the attachment portion may be at least partially made of aluminum and/or a composite material, and the seal portion may be at least partially made of an elastomer, such as fluorosilicone.

The deformable segment of the seal portion may be shaped such that the cross-section of the deformable segment in a direction substantially parallel to an outer surface of the sealing member varies in a direction substantially normal to an outer surface of the sealing member. In addition, the end of the pliant seal portion of the sealing member may be angled such that the outer surface of the pliant seal portion protrudes more than a portion of the pliant seal portion that is near the deformable segment.

The deformable segment may be made of an elastomer sponge, such as a silicone sponge. The sealing member may be at least partially covered with a wear resistant material, and the wear resistant material may be at least partially covered with a scrim, such as a conductive scrim. Furthermore, the scrim may be at least partially covered with an elastomer, which may be conductive, such as fluorosilicone.

Embodiments of the apparatus for sealing at least two surfaces may also include a receiving aperture. The receiving aperture is defined by at least one of the surfaces, and is adapted to receive and retain the deformable segment of the seal portion of the sealing member. At least a portion of the receiving aperture may be further defined by at least one engagement member extending from at least one of the surfaces. The sealing member is therefore capable of being positioned such that the deformable segment is inserted in the receiving aperture.

Embodiments of the apparatus for sealing at least two surfaces may further include at least one coating, such as paint, on a side of the sealing member opposite the surfaces. In addition, the sealing member may be fixed to one of the surfaces with a rivet that extends through the attachment portion and the surface. The sealing member may also define an opening, and a fastener underlying a portion of the deformable segment of the sealing member may be aligned with the opening in the sealing member. As such, the deformable segment is disengaged from the receiving aperture when the fastener is at least partially loosened.

The present invention also includes a method of sealing at least two surfaces with a sealing member having an attachment portion and a seal portion. The method includes fixing the attachment portion of the sealing member to one of the surfaces, positioning a deformable segment carried by the seal portion, and securing at least one engagement member to at least one of the surfaces. The deformable segment is positioned within a receiving aperture defined by at least one of the surfaces, and the at least one engagement member is secured such that the deformable segment must deform to be disengaged from the receiving aperture. At least one coating, such as paint, may be applied on the side of the sealing member opposite the surfaces following the securing of the engagement member to at least one of the surfaces. In addition, a release material may be applied on at least a portion of the side of the sealing member facing the surfaces prior to positioning the deformable segment within the receiving aperture, to facilitate removal of the sealing member and release of the deformable segment from the receiving aperture.

Following positioning of the deformable segment within the receiving aperture, an area in the receiving aperture, between the deformable segment and the surface to which the sealing member is fixed, may be filled with a filler. In addition, prior to positioning the deformable segment within the receiving aperture, a fastener may be aligned with a portion of the deformable segment. In this embodiment of the method of the present invention, the fastener may be accessed via an opening defined by the sealing member, such that accessing the fastener includes at least partially loosening the fastener and disengaging the deformable segment from the receiving aperture.

Thus, the apparatus and method for sealing at least two surfaces of the present invention provide an effective and easy technique for securely sealing parts of an object, such as doors, panels, covers and the like, to the surrounding structure. In addition, the apparatus and method of the present invention permit the doors, panels, covers or the like to be unsealed to provide access, and then resealed in a fraction of the time it takes to access such sealed parts utilizing conventional techniques. Furthermore, the apparatus and method of the present invention provide a seal that may be easily disengaged and engaged in order to access or open the door, panel, cover or the like, even in instances in which a coating, such as paint, has already been applied over the seal, such that the coating does not need to be reapplied after engaging the seal.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

FIGS. 5A and 5B illustrate perspective cross-sectional views of a technique for disengaging the deformable segment of the sealing member from the receiving aperture, according to one embodiment of the present invention.

DETAILED DESCRIPTION OF THE INVENTION

The present inventions now will be described more fully hereinafter with reference to the accompanying drawings, in which some, but not all embodiments of the invention are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

The apparatus and method of the present invention permit various surfaces to be sealed. For example, the apparatus and method of the present invention may provide a seal between peripheral portions of a door, panel or other covering and the surrounding structure. While the apparatus and method are useful in a wide variety of applications, the apparatus and method are particularly advantageous for vehicles, such as aircraft and the like, that will be coated, such as with one or more layers of paint to provide a smooth aerodynamic surface, since the seal provided by the apparatus and method of the present invention provides a smooth transition from a door, panel, cover or the like to the surrounding structure. Additionally, the apparatus and method of the present invention provide a seal that may be easily disengaged in order to access or open the door, panel or the like, even in instances in which a coating, such as paint, has already been applied over the seal. The apparatus and method of the present invention then permit the door, panel or the like to be resealed to the surrounding structure, without having to repair or replace the coating, which remains upon the seal even following its disengagement and engagement.

Figure 1:
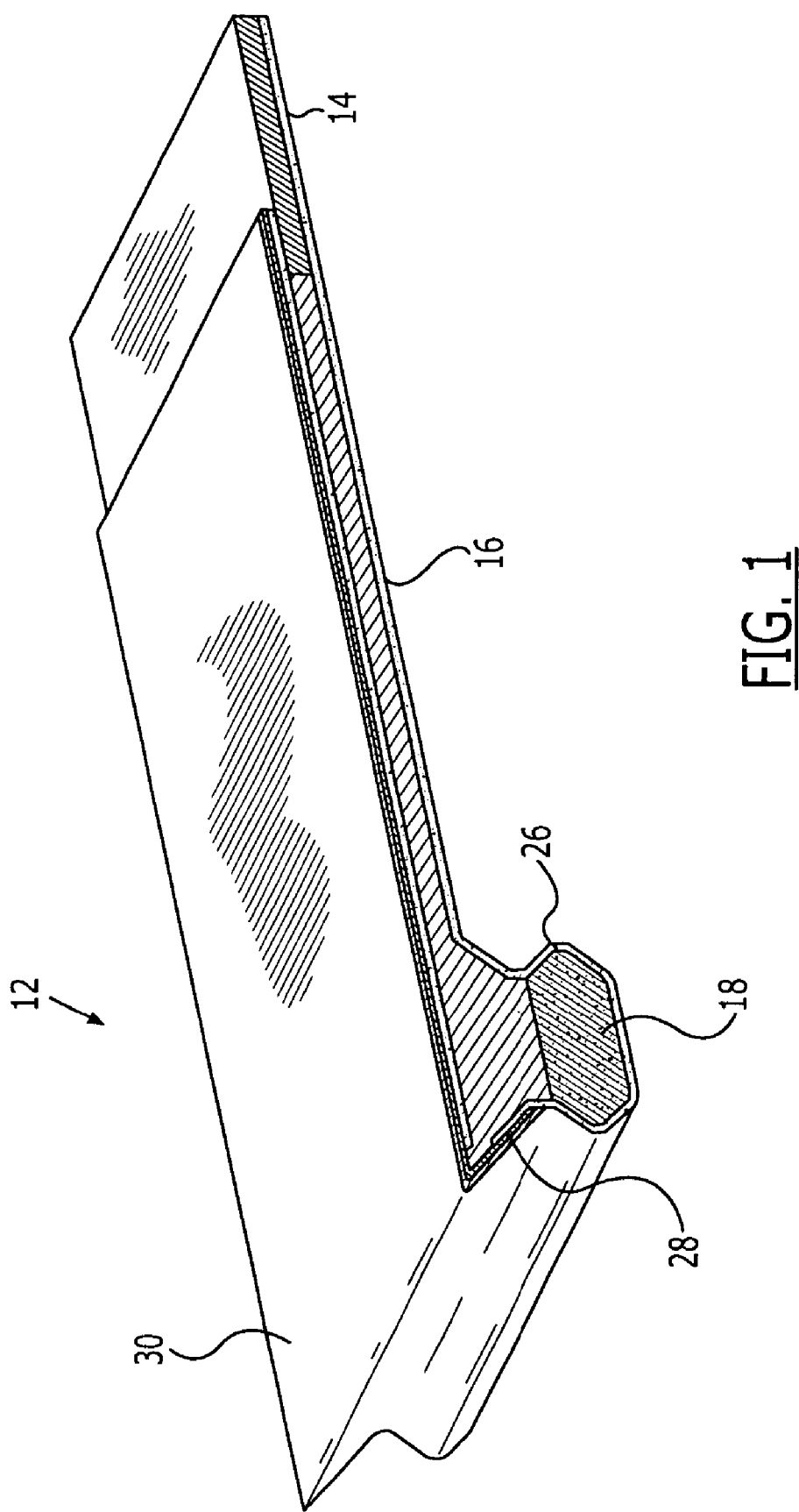
FIG. 1 illustrates a perspective cross-sectional view of a sealing member according to one embodiment of the present invention.

FIG. 1 is an illustration of one embodiment of a sealing member 12 of the apparatus and method for sealing surfaces of the present invention. The sealing member 12 has an attachment portion 14 and a seal portion 16. The attachment portion 14 is capable of being fixed to one of the surfaces to be sealed. As such, the attachment portion 14 is typically made of a material that is less pliable than the seal portion 16. In one embodiment of the sealing member 12 of the present invention, the attachment portion 14 is at least partially made of a rigid material, such as aluminum and/or a composite material. As FIGS. 2 and 3 further illustrate, a fastener 19, such as a rivet or the like, may extend through the attachment portion 14 and one of the surfaces, shown as extending through surface 20 in FIGS. 2 and 3, to fix the sealing member 12 to the surface. The attachment portion 14 may be located at any point along the sealing member that contacts at least one of the surfaces. For instance, the attachment portion 14 may be located at one end of the sealing member 12, or it may be located at an interior portion of the sealing member 12.

The seal portion 16 of the sealing member 12 is connected to the attachment portion 14, and includes a deformable segment 18 that faces the surfaces 20, 22. In one embodiment of the present invention, the components of the sealing member 12, such as the seal portion, the attachment portion and the deformable segment are molded and bonded together to form the sealing member 12. The seal portion 16 may be made of any type of pliable material, such as an elastomer material. In one embodiment of the present invention, the elastomer is a fluorosilicone material, such as a grade 50 fluorosilicone material, however, other pliable materials and other grades of fluorosilicone material may be used for the seal portion 16 of the sealing member 12.

As shown in FIG. 1, the deformable segment 18 that is connected to the seal portion 16 may be shaped such that a cross-section of the deformable segment 18 in a direction substantially parallel to an outer surface of the sealing member 12 is greater than a cross-section of the deformable segment 18 in a direction substantially normal to the outer surface of the sealing member 12. The distal end portion of the seal portion 16 is typically shaped such that the distal end portion of the seal portion cooperates with the receiving aperture and/or the surfaces when the sealing member 12 is installed, as described hereinbelow. In one embodiment of the present invention, the seal portion 16 has an angled distal end portion, such that the outer surface of the seal portion protrudes more than the portion of the seal portion 16 that faces the surfaces and is proximate the deformable segment 18.

Figure 3:
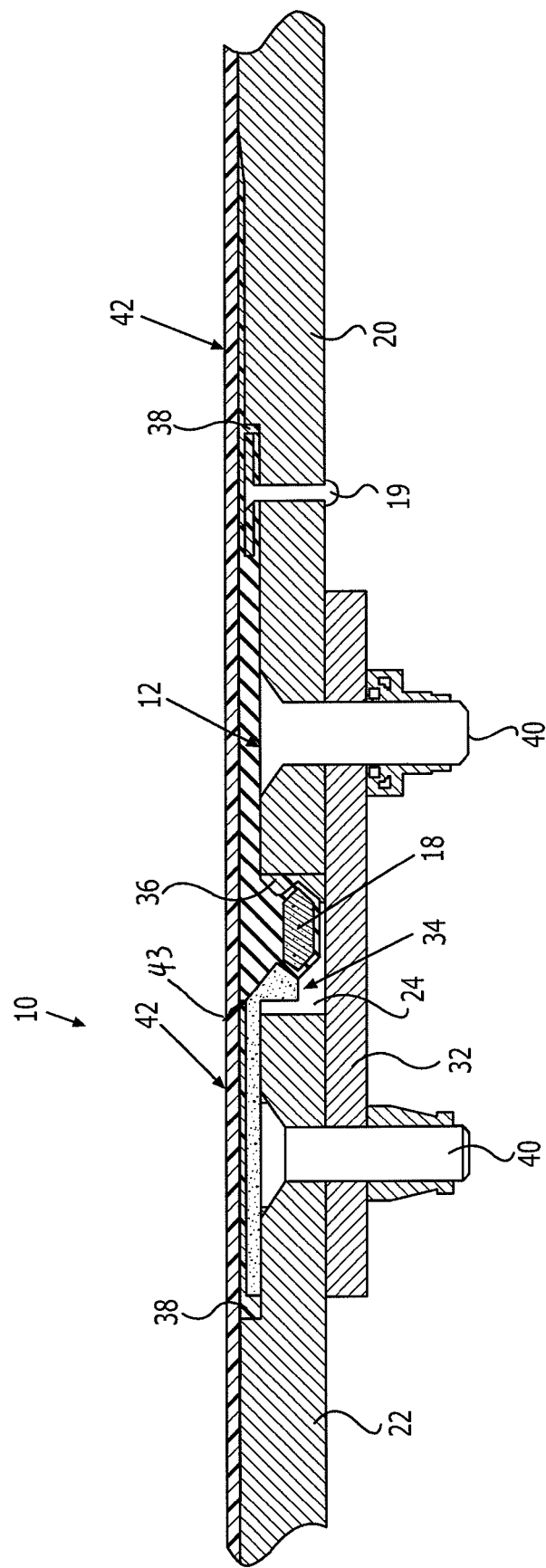
FIG. 3 illustrates a cross-sectional view of an engaged sealing apparatus, including a sealing member, a receiving aperture, and at least one engagement member for sealing the surfaces according to one embodiment of the present invention.

The deformable segment 18 of the sealing member 12 may be made of any type of material that is capable of deforming when sufficient pressure is applied, then substantially resuming its prior shape when the pressure is no longer applied. For instance, the material of the deformable segment 18 may be capable of deforming when it is pressed into a portion of the receiving aperture 24 that is smaller than the deformable segment. The material of the deformable segment 18 then may be capable of resuming its prior shape once the deformable segment 18 has passed through the portion of the receiving aperture 24 that is smaller than the deformable segment, as shown in FIG. 3, and as further described in this document. As such, in one embodiment of the deformable segment 18, the deformable segment is made of an elastomer sponge, such as a silicone sponge. The silicone sponge may be an AMS3195 standard, however, other standards, other sponge materials or other types of deformable materials may be used for the deformable segment 18.

The sealing member 12, including the deformable segment 18, may be at least partially covered with a wear resistant material 26. The wear resistant material prevents the sealing member 12 from being damaged, such as being torn, as the sealing member is repeatedly engaged and disengaged. The wear resistant material 26 may be any type of durable material that is also pliable, such as a Dacron™ material, commercially available from E.I. du Pont de Nemours and Company Corporation. In other embodiments of the sealing member of the present invention, the wear resistant material 26 may be a polyester and/or a nylon material.

In certain embodiments of the present invention, such as those embodiments that protect equipment within the vehicle from electromagnetic interference (EMI), the wear resistant material 26 may then be at least partially covered with a conductive scrim 28. The embodiment of the sealing member 12 shown in FIG. 1 illustrates the conductive scrim 28 covering the outer surface and part of the angled end portion of the sealing member 12, but the conductive scrim 28 may at least partially cover other areas of the sealing member 12 also. The conductive scrim 28 may be any type of conductive material that is also pliable. For example, in one embodiment of the sealing member 12 of the present invention the conductive scrim 28 is silver plated.

For other applications of the seal of the present invention, such as those that protect equipment within the vehicle from EMI, the conductive scrim 28 may then be at least partially covered with a conductive material 30. In other embodiments of the sealing member 12 of the present invention, the conductive material 30 may at least partially cover other areas of the sealing member 12 also. Any type of pliable conductive material may be utilized for the conductive material 30. For example, in embodiments of the sealing member of the present invention, the conductive material 30 may be a conductive elastomer. One example of a conductive elastomer that may be utilized is fluorosilicone. While any other type of pliable conductive material, or any grade of fluorosilicone and/or types of fluorosilicone may be utilized, grade 50 silver loaded fluorosilicone may be utilized in some embodiments of the present invention.

In particular embodiments of the sealing member 12 of the present invention, the materials utilized to form the sealing member 12, as described hereinabove, may be chosen such that the resulting sealing member has certain characteristics. For example, the materials may be chosen such that the sealing member 12 may withstand temperatures from −65° F. to +190° F., may be resistant to oil and fuel, may be resistant to ultraviolet light, and/or may be resistant to tears and abrasion. In one embodiment of the sealing member 12, examples of the materials utilized to achieve the above characteristics are a grade 50 silver loaded fluorosilicone utilized for the conductive material 30, a silver plated conductive scrim utilized for the conductive scrim 28, Dacron™ material, commercially available from E.I. du Pont de Nemours and Company Corporation, utilized for the wear resistant material 26, grade 50 fluorosilicone utilized for the seal portion 16, AMS 3195 silicone sponge utilized for the deformable segment 18, and aluminum utilized for the attachment portion 14.

Figure 2:
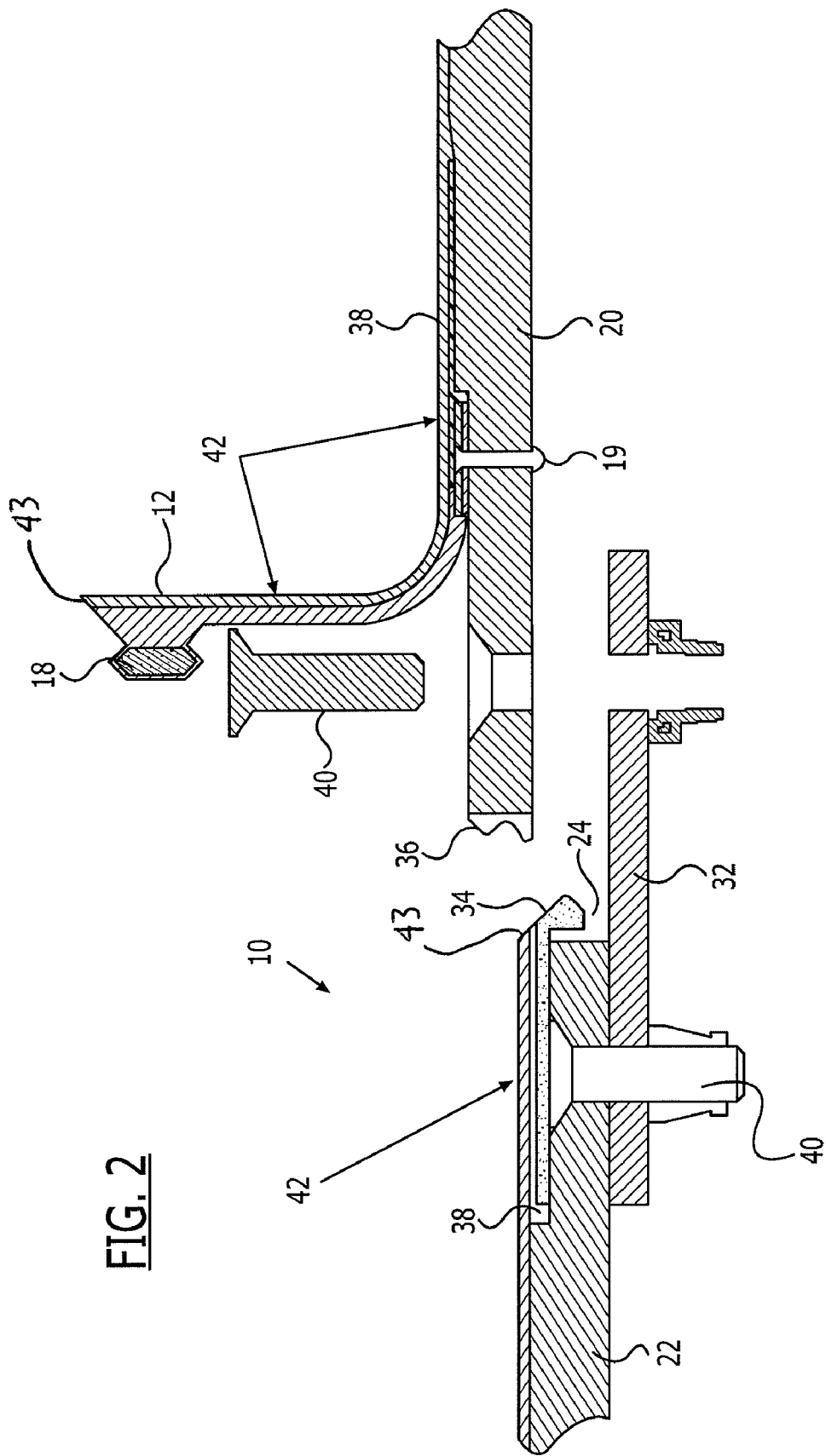
FIG. 2 illustrates a cross-sectional view of a disengaged sealing apparatus, including a sealing member, a receiving aperture, and at least one engagement member for sealing the surfaces according to one embodiment of the present invention.

The sealing member 12 of the present invention may then be utilized to seal at least two surfaces 20, 22, as illustrated by FIGS. 2 and 3. The sealing member 12 is attached to one of the surfaces 20, 22, as described above in this document. The surfaces 20, 22, as shown in the embodiments of FIGS. 2 and 3, may be at least partially disposed on an underlying structure 32. For example, in one embodiment, surface 20 may be a door, panel, cover or the like, while surface 22 may be the surrounding structure of an air vehicle. In the embodiments shown in FIGS. 2 and 3, the surfaces 20, 22 are attached to the underlying structure 32 with fasteners 40 that extend through the surfaces and the underlying structure 32. In other embodiments, the surfaces 20, 22 may be attached to the underlying structure 32 in any other manner known to those skilled in the art, such as any other type of fastener or with any type of bonding agent. Alternatively, the surfaces 20, 22 may be stand-alone without an underlying structure, or one of the surfaces may also be integral with and serve as the underlying structure.

In addition to the sealing member 12, the apparatus 10 for sealing at least two surfaces may include a receiving aperture 24. The receiving aperture 24 may be defined by at least one of the surfaces 20, 22. As such, the receiving aperture 24 may be formed in the surface to which the sealing member 12 is not attached. Alternatively, the receiving aperture 24 may be formed between the surfaces, as shown in FIGS. 2 and 3. The location of the receiving aperture 24 on the surface(s) is where the deformable segment 18 of the sealing member 12 comes into contact with the surface(s) when the sealing member 12 is extended along the surface(s). Thus, the receiving aperture 24 receives and retains the deformable segment 18 of the sealing member 12.

To retain the deformable segment 18 of the sealing member 12, the walls of the receiving aperture 24 may be shaped such that at least a portion of the deformable segment 18 is held within the receiving aperture 24. For instance, the outermost portion of the receiving aperture may have a smaller lateral dimension than a more inward portion. The lateral dimension also may be smaller than at least a portion of the deformable segment 18, such that the deformable segment 18 deforms as it is pressed through the smaller lateral dimension portion of the receiving aperture 24. Once at least a portion of the deformable segment 18 is pressed through the smaller lateral dimension portion of the receiving aperture 24, the deformable segment 18 may resume its resting shape, which is larger than the smaller lateral dimension portion of the receiving aperture 24, such that the deformable segment 18 is retained within the receiving aperture 24, as illustrated in the embodiment of the apparatus 10 of FIG. 3. Alternatively, the receiving aperture 24 may have other shapes, so long as the receiving aperture 24 is capable of receiving and retaining the deformable segment 18.

The surface or surfaces may completely define the receiving aperture 24, including the shape of the receiving aperture 24 to receive and retain the deformable segment 18, as described above. In other embodiments, the smaller lateral dimension portion of the receiving aperture 24 may be formed by at least one engagement member, which may extend from at least one of the surfaces to further define the receiving aperture. The engagement member may have any type of shape and may be attached to the surface in any manner known to those skilled in the art, so long as the engagement member is capable of receiving and retaining the deformable segment 18 of the sealing member 12 within the receiving aperture. For example, in the embodiments shown in FIGS. 2 and 3, first engagement member 34 extends from surface 22, and a portion of the first engagement member 34 extends into the receiving aperture 24. As shown in FIGS. 2 and 3, the distal end of the first engagement member 34 may be angled as it extends into the receiving aperture 24 to complement the shape of the distal end of the seal portion 16, and to engage the smaller lateral dimension portion of the deformable segment 18. In a specific embodiment of the first engagement member 34 of the present invention, the first engagement member 34 may be bonded to the outer portion of the surface 22 with an adhesive. One example of an adhesive used to bond a first engagement member 34 to the outer portion of a surface is an EA9394 Epoxy, such as that commercially available from Hysol Corp. In other embodiments of the apparatus of the present invention, other types of adhesives may be utilized and other attachment techniques may be used. For example, in addition to or instead of bonding an engagement member to a surface with adhesive, the engagement member may be fixed to the surface with any type of fasteners known to those skilled in the art, such as rivets. The first engagement member 34 may be made of any type of material that is at least more rigid than the deformable segment 18 and capable of retaining the deformable segment 18 within the receiving aperture 24. For example, the first engagement member 34 may be made of aluminum.

The surface(s) may define at least part of the receiving aperture 24, and cooperate with the first engagement member 34 to engage the deformable segment 18, as described above. Or, the surface(s) may define a larger opening than required to engage the deformable segment 18, and then the opening may be filed with a second engagement member 36. The embodiments of the apparatus 10 of the present invention shown in FIGS. 2 and 3 further illustrate second engagement member 36 extending from surface 20. Second engagement member 36 may be attached to surface 20 in any manner known to those skilled in the art. For instance, as shown in FIGS. 2 and 3, second engagement member 36 may be attached to a wall of receiving aperture 24 in order to further define receiving aperture 24. In one embodiment, the second engagement member 36 may be made of an epoxy material that fills the area between the deformable segment 18 and the wall of the receiving aperture defined by surface 20, such that the second engagement member 36 bonds to the wall of the receiving aperture defined by surface 20. One example of an epoxy material that may be used for second engagement member 36 is an EA9394 epoxy, such as that commercially available from Hysol Corp. Thus, the epoxy may be applied to the area between the deformable segment 18 and the wall of the receiving aperture defined by surface 20, such that the second engagement member 36 forms in a shape that cooperates with the shape of the deformable segment 18 and bonds to the wall of the receiving aperture defined by surface 20 as the epoxy hardens. To ensure the epoxy does not adhere to the portion of sealing member 12 that contacts the second engagement member 36, a release material may be applied to at least that portion of the sealing member 12. Any type of release material known to those skilled in the art may be utilized, such as a spray, wax and/or Teflon™ tape release material.

In alternative embodiments of the apparatus of the present invention, second engagement member 36 may be made of any type of material that is at least more rigid than the deformable segment 18, such as those materials described hereinabove with respect to first engagement member 34. For these embodiments, the second engagement member 36 may be attached to surface 20 with an adhesive or any type of fastener, such as those described hereinabove with respect to first engagement member 34.

Figure 4A:
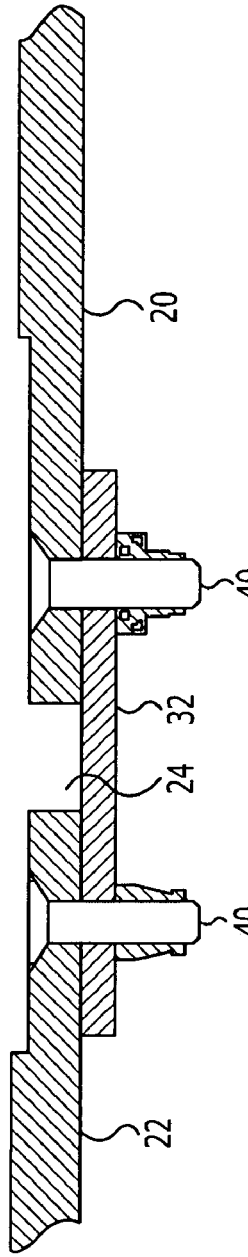
FIGS. 4A, 4B, 4C and 4D illustrate cross-sectional views of the steps involved in installing the sealing member according to one embodiment of the present invention.
Figure 4B:
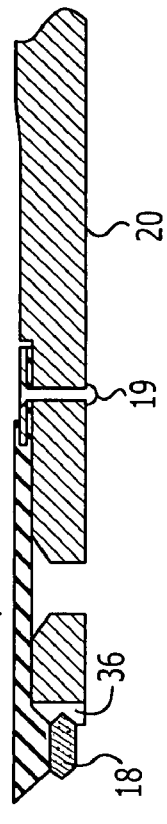

FIGS. 4A to 4D illustrate the various steps involved in installing a sealing member 12 to seal surfaces 20 and 22, according to one embodiment of the present invention. FIG. 4A illustrates surfaces 20 and 22, at least one of which may be a door, panel, cover or the like, and the other of which may be the surrounding structure, such as an air vehicle, that are fastened to an underlying structure 32 with fasteners 40. FIG. 4A shows that between the surfaces 20 and 22, a receiving aperture 24 may be defined as part of a first step in the installation by fastening the surfaces 20 and 22 to the underlying structure 32 with fasteners 40. FIG. 4B illustrates an embodiment of a second step of installing the sealing member 12 on surface 20 with fastener 19, which extends through the attachment portion 14 of the sealing member 12 and the surface 20, however, the sealing member 12 may be installed on surface 20 by any other technique known to those skilled in the art, as described hereinabove. The sealing member 12 may be installed while surface 20 is separate from surface 22 and/or underlying structure 32, as shown in FIG. 4B. Or, sealing member 12 may be installed while surface 20 is connected to surface 22 and/or underlying structure 32. Prior to or subsequent to attaching the sealing member 12 to the surface 20, a release material, as described above, may be applied to at least the portion of the sealing member 12 that will contact the second engagement member 36, if the second engagement member 36 is made of epoxy, as described above. Once the sealing member 12 is positioned appropriately, such that the deformable segment 18 is within the receiving aperture 24, a second engagement member 36 may be formed to further define the receiving aperture 24. For example, the second engagement member 36 may be formed of an epoxy that fills the area between the deformable segment 18 and the surface 20, as described hereinabove in this document. The release material aides in the release of the sealing member 12 from the surfaces and the receiving aperture when the sealing member is disengaged, particularly when the second engagement member 36 is formed by an epoxy filler, as described above in this document. For example, the epoxy adheres to the surface 20, but the release material prevents the epoxy from adhering to the sealing member also. In other embodiments, the second engagement member 36 may be formed of any type of material that is more rigid than the deformable segment 18, then attached to the surface 20 in any manner known to those skilled in the art, such as with a fastener and/or an adhesive, as described hereinabove, such that release material may not be needed.

Figure 4C:
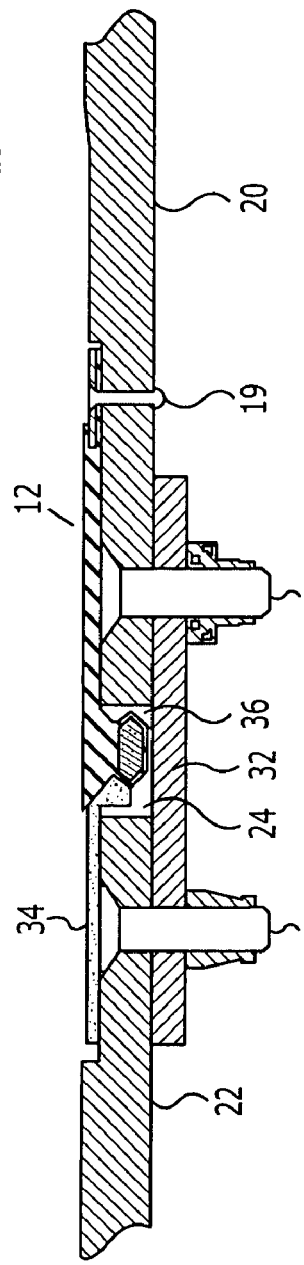
Figure 4D:
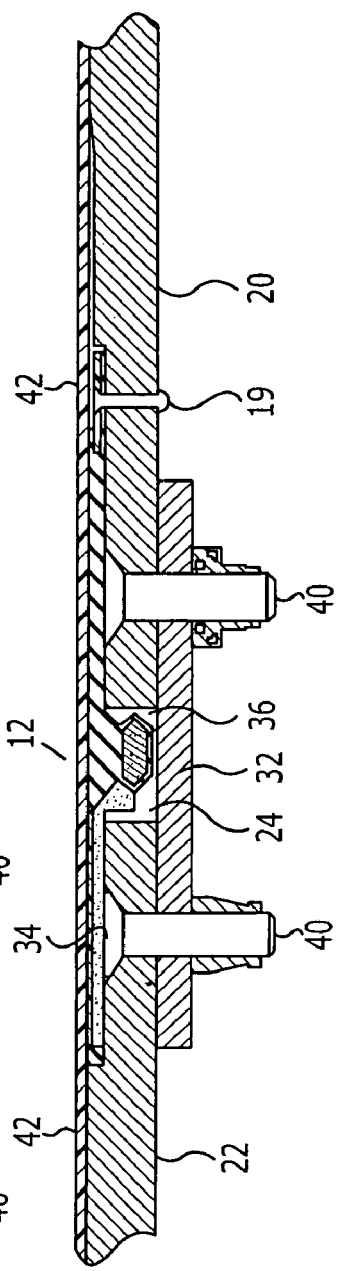

FIG. 4C illustrates a third step in one embodiment of the installation of the sealing member 12, that includes attaching a first engagement member 34 to surface 22 in order to further define receiving aperture 24, as also described hereinabove. The first engagement member 34 may be attached such that the angled portions of the first engagement member 34 engage the smaller diameter portion of the deformable segment 18, as described hereinabove in this document. FIG. 4D shows a fourth step in one embodiment of the installation of a sealing member 12, that includes filling and fairing between the sealing member 12 and surface 20, and between engagement member 34 and surface 22, to create a smooth outer surface of the sealing apparatus 10, as described hereinbelow in this document. The outer surface may then be coated with any type of desired coating 42, such as paint, as described further hereinbelow in this document.

Once the engagement member(s) and the sealing member 12 are attached to the surfaces as desired, the areas surrounding the engagement member(s) and the sealing member may be filled and faired such that the outer portions of the surfaces are smooth. For instance, in the embodiment of the apparatus 10 of the present invention as illustrated in FIGS. 2 and 3, the area between the end of the sealing member 12 and the surface 20, and the area between the end of engagement member 34 and the surface 22 may be filled with filler 38. In addition, filler 38 may fill any other areas on the engagement member (s) and/or the sealing member 12 to create a smooth transition between the engagement member(s) and/or the sealing member 12 and the surface(s). As shown in FIGS. 2 and 3, for example, filler 38 fills the area above engagement member 34 and a portion of the area above the attachment portion 14 of the sealing member 12 to create a smooth transition between the surfaces(s), the engagement member 34, and the sealing member 12. The filler 38 may be any type of material that can fill the areas between the surfaces and the sealing member and/or engagement members. For instance, in one embodiment of the apparatus of the present invention, the filler 38 may be a polyester body filler, such as that commercially available from Bondo Corp. In alternative embodiments, the sealing member 12 and the engagement member(s) may be formed to fit into recessed areas of the surface(s) such that the transition between the sealing members and engagement member(s) and the surfaces are smooth.

The sealing apparatus 10 of the present invention then may be coated with any type of coating known to those skilled in the art. As shown in FIGS. 2 and 3, the outer portions of the surfaces 20, 22, the sealing member 12 and the engagement member 34 are coated with coating 42. For instance, embodiments of the sealing apparatus 10 of the present invention may be coated with one or more layers of paint. To ensure that the sealing member 12 may be disengaged and engaged within the receiving aperture 24 and/or the at least one engagement member 34, 36, as shown in FIGS. 2 and 3, respectively, the coating(s) may be applied such that there is a splice 43 in the coating 42 at the point coincident with the distal end of the seal portion 16.

If the need arises to access the door, panel or the like, which has been sealed in accordance with the apparatus and method of the present invention, the deformable segment 18 may be released from the receiving aperture 24 by any technique known to those skilled in the art. For example, in the embodiment of the sealing apparatus 10 shown in FIGS. 5A and 5B, the sealing member 12 defines an opening 44 through the deformable segment 18. The opening 44 may be aligned with a fastener 46, such that the fastener 46 underlies a portion of the deformable segment 18. Thus, the fastener 46 may be loosened or otherwise at least partially disengaged from an underlying structure 32, which moves the fastener 46 into contact with the deformable segment 18 and forces the deformable segment 18 out of the receiving aperture 24 and/ or out of engagement with the at least one engagement member 34, 36. One embodiment of the sealing apparatus 10 of the present invention in which the fastener 46 is loosened thereby disengaging the deformable segment 18, is shown in FIG. 5B. FIGS. 5A and 5B also illustrate one embodiment of a technique for at least partially removing the fastener 46 from the underlying structure 32. As shown, an alien wrench 48 may be inserted through the opening 44 in sealing member 12 and into the fastener 46. The alien wrench 48 may then be rotated, which in turn rotates the fastener 46, to at least partially remove the fastener 46 from the underlying structure 32. The deformable segment 18 may be disengaged from the receiving aperture 24 in any other manner known to those skilled in the art, such as with any other type of mechanical or electromechanical means, and with any other type of fastener or other part that is capable of being installed and removed from the underlying structure 32. In addition, in embodiments of the sealing apparatus 10 of the present invention that do not include an underlying structure 32, the techniques for disengaging the deformable segment 18 from receiving aperture 24 may be employed with the fastener engaging a portion of at least one of the surfaces 20, 22 that underlies the deformable segment 18 or some other part of the seal portion 16, instead of the underlying structure 32.

After disengaging at least a portion of the deformable segment 18 from the receiving aperture 24, the remainder of the deformable segment 18 may be disengaged by applying a force to the sealing member 12 in a direction away from the surfaces 20, 22. For instance, once a portion of the deformable segment 18 is removed, an operator may move his fingers between the sealing member 12 and the outer surface to disengage the remainder of the deformable segment 18 from the receiving aperture 24 and/or the at least one engagement member 34, 36. The remainder of the deformable segment 18 may be disengaged by any other manner known to those skilled in the art.

As described with respect to FIGS. 4A to 4D, to facilitate disengagement of the sealing member 12, and particularly the deformable segment 18, from the receiving aperture 24 and/ or the at least one engagement member 34, 36, a release material may be applied to at least a portion of the inner surface of the sealing member 12 that faces the surface(s). For example, a release material may be applied to at least the portion of the deformable segment 18 that comes in contact with an epoxy material, such as an epoxy material that may be utilized to form engagement member 36, as described hereinabove. The release material may also be applied to other portions of the sealing member 12 if so desired. Any type of release material known to those skilled in the art may be utilized, such as any type of tape, spray and/or wax release material.

In the embodiments of the sealing apparatus 10 of the present invention shown in FIGS. 5A and 5B, once the deformable segment 18 is disengaged as described above, the fastener 46 may be engaged back into the underlying structure 32 to prepare for the deformable segment 18 to be reinserted in the receiving aperture 24 following completion of the task (s) that required access to the door, panel, cover or the like that is sealed according to the apparatus and method of the present invention. For example, the allen wrench 48 may be inserted into the fastener 46 and rotated in a direction opposite the direction the allen wrench 48 was rotated to at least partially remove the fastener 46 from the underlying structure 32, in order to install the fastener 46 back into the underlying structure 32. In other embodiments of the sealing apparatus 10 of the present invention, the receiving aperture 24 may be prepared for re-engagement of the deformable segment 18 in any manner known to those skilled in the art. Once the receiving aperture 24 is prepared for re-engagement of the deformable segment 18, the deformable segment 18 may be inserted into the receiving aperture 24 by aligning the deformable segment 18 with the receiving aperture 24 and applying pressure to at least the portion of the deformable segment 18. As explained hereinabove in this document, applying pressure to the deformable segment 18 toward the receiving aperture forces the deformable segment to temporarily deform as it moves through the portion of the receiving aperture 24 that has a smaller lateral dimension than the deformable segment 18. After moving through the portion of the receiving aperture 24 that has a smaller lateral dimension than the deformable segment 18, the deformable segment 18 may resume its resting shape, which has a larger lateral dimension than the smaller lateral dimension of the receiving aperture 24, such that the deformable segment 18 is retained within the receiving aperture 24, as illustrated in the embodiment of the apparatus 10 of FIG. 3.

Thus, the sealing apparatus 10 and associated method for sealing at least two surfaces of the present invention provide an effective and easy technique for sealing parts of an object, such as doors, panels, covers and the like to a surrounding structure. In addition, the apparatus and method for sealing at least two surfaces of the present invention permits easy access to the doors, panels, covers and the like, such that the parts may be unsealed and accessed, then resealed in a fraction of the time it takes to access such sealed parts utilizing conventional techniques. Furthermore, if the outer surfaces of the sealing apparatus 10 and the surfaces are coated, such as with one or more layers of paint, there may be a break in the coating at a point coincident with a distal end of the sealing apparatus 10, such that the outer surfaces do not have to be recoated each time the doors, panels or the like are accessed.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. An apparatus for sealing at least two surfaces, comprising:
    a sealing member having an attachment portion fixed to one of the surfaces, said sealing member also including a seal portion connected to said attachment portion, wherein the seal portion comprises a deformable segment that faces the surfaces, wherein the sealing member defines an opening;
    a receiving aperture defined by at least one of the surfaces, wherein said receiving aperture is adapted to receive and retain the deformable segment of the seal portion of said sealing member;
    a fastener accessible via the opening in said sealing member and underlying a portion of said sealing member, such that the deformable segment is at least partially and forcibly disengaged from said receiving aperture when said fastener is at least partially loosened without detaching the attachment portion from the respective one of the surfaces;
    a coating disposed on said sealing member and the at least two surfaces, said coating extending continuously across said sealing member and at least one of the surfaces; and
    a filler disposed within and filling an area in the receiving aperture, between the deformable segment and the surface to which the sealing member is fixed,
    wherein the deformable segment is positioned fully within the receiving aperture,
    wherein the attachment portion is securely fixed by a fastening element to one of the surfaces at a location outside of the receiving aperture, and
    wherein the fastener is spaced apart from the fastening element along a length of the sealing member.

2. The apparatus according to claim 1, wherein said sealing member is at least partially made of a pliable material, such that the seal portion of said sealing member bends relative to the attachment portion of said sealing member.

3. The apparatus according to claim 1, wherein the attachment portion of said sealing member is made of a material that is less pliable than the seal portion.

4. The apparatus according to claim 1, wherein the deformable segment is comprised of an elastomer sponge material.

5. An apparatus for sealing at least two surfaces, comprising:
    a sealing member having an attachment portion fixed to one of the surfaces, said sealing member also including a seal portion connected to said attachment portion, wherein the seal portion comprises a deformable segment that faces the surfaces, wherein said sealing member is capable of being positioned such that the deformable segment is inserted into a receiving aperture defined between the at least two surfaces, and wherein said sealing member defines an opening; and
    a fastener aligned with the opening in said sealing member and underlying a portion of the deformable segment of said sealing member, such that the deformable segment is forcibly disengaged from said receiving aperture when said fastener is at least partially loosened without detaching the attachment portion from the respective one of the surfaces
    wherein the attachment portion is securely fixed by a fastening element to one of the surfaces at a location outside of the receiving aperture, and
    wherein the fastener is spaced apart from the fastening element along a length of the sealing member.

6. The apparatus according to claim 5, further comprising at least one coating on a side of said sealing member opposite the surfaces.

7. The apparatus according to claim 5, wherein said sealing member is at least partially made of a pliable material, such that the seal portion of said sealing member bends relative to the attachment portion of said sealing member.

8. The apparatus according to claim 5, wherein the deformable segment of said sealing member is made of an elastomer sponge material.

9. The apparatus according to claim 5, wherein the attachment end of said sealing member is made of a material that is less pliable than the seal portion.

10. The apparatus according to claim 5, wherein the fastening element comprises a rivet extending through the attachment portion of said sealing member and one of the surfaces to fix said sealing member to one of the surfaces.

11. A method of sealing at least two surfaces with a sealing member having an attachment portion and a seal portion, comprising:
    fixing the attachment portion of the sealing member to one of the surfaces;
    applying a release material on at least a portion of a side of the sealing member facing the surfaces;
    following the applying of the release material, positioning a deformable segment carried by the seal portion of the sealing member within a receiving aperture defined by at least one of the surfaces, wherein positioning the deformable segment comprises placing the deformable segment fully within the receiving aperture;

installing a fastener in an aligned relationship with a portion of the deformable segment prior to positioning of the deformable segment within the receiving aperture;

filling an area in the receiving aperture, between the deformable segment and the surface to which the sealing member is fixed, with a filler, following positioning of the deformable segment within the receiving aperture; and applying a coating on the sealing member and the at least two surfaces such that the coating extends continuously across the sealing member and at least one of the surfaces.

12. The method according to claim 11, further comprising accessing the fastener via an opening defined by the sealing member, wherein accessing the fastener comprises at least partially loosening the fastener and disengaging the deformable segment from the receiving aperture.

13. A method of sealing at least two surfaces with a sealing member having an attachment portion and a seal portion and defining an opening therethrough, comprising:

fixing the attachment portion of the sealing member to one of the surfaces;

positioning a deformable segment carried by the seal portion of the sealing member within a receiving aperture defined by at least one of the surfaces so as to overlie a fastener, wherein positioning the deformable segment comprises positioning the sealing member such that the fastener is aligned with the opening defined by the sealing member;

applying a coating on the sealing member and the at least two surfaces such that the coating extends continuously across the sealing member and at least one of the surfaces, wherein applying the coating comprises defining a splice in the coating coincident with a distal end of the sealing member, thereby separating the coating that is disposed on the sealing member and one of the surfaces from the coating that is disposed on the other surface; and accessing the fastener via the opening defined by the sealing member, wherein accessing the fastener comprises at least partially loosening the fastener and disengaging the deformable segment from the receiving aperture.

14. The method according to claim 13, further comprising installing the fastener in an aligned relationship with a portion of the deformable segment prior to positioning of the deformable segment within the receiving aperture.

15. The method according to claim 13, further comprising applying a release material on at least a portion of a side of the sealing member facing the surfaces prior to positioning the deformable segment within the receiving aperture, to facilitate removal of the sealing member and release of the deformable segment from the receiving aperture.

16. The method according to claim 13, further comprising filling an area in the receiving aperture, between the deformable segment and the surface to which the sealing member is fixed, with a filler, following positioning of the deformable segment within the receiving aperture.

* * * * *